Patented Aug. 2, 1927.

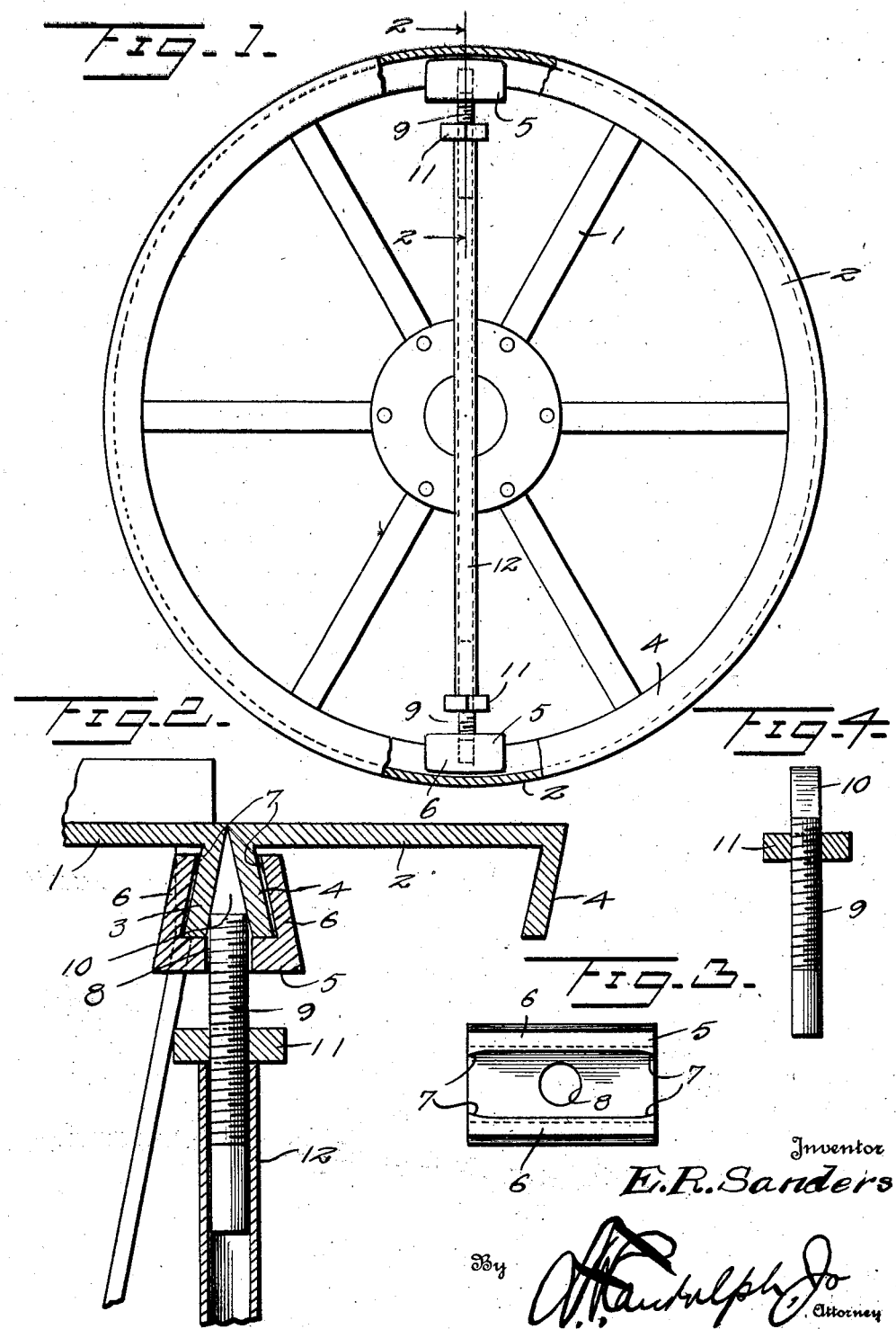

1,637,876

UNITED STATES PATENT OFFICE.

EDGAR R. SANDERS, OF LAKEVILLE, INDIANA.

CLAMPING MEANS FOR EXTRA TREAD RIMS OF TRACTOR WHEELS.

Application filed February 8, 1927. Serial No. 166,744.

The invention relates to improved means for attaching the extra tread rim to tractor wheels when the tractor is to be used in soft ground, such for instance as plowed ground, boggy land, and the like, and has for its object the provision of means for clamping the extra rim in position that is simple in operation, and quickly adjusted to attach the rim or detach it from the wheel, and that will securely hold the extra rim in position on the wheel.

The invention will be described in detail hereinafter and will be found illustrated in the accompanying drawings, in which Figure 1 is a side view, partly in section, showing a tractor wheel and the extra rim in position held by the improved clamping means, Figure 2 is a transverse detail sectional view on a plane indicated by the line 2—2 of Figure 1, and on a larger scale, Figure 3 is a plan view of one of the rim flange clamps, and Figure 4 is a detail view, partly in section, of one of the wedge members.

In the drawings, similar reference characters will be used to designate corresponding parts throughout the several views.

The tractor wheel 1 to which the extra tread rim 2 is to be applied, is provided with an inturned flange 3, the extra tread rim 2 being also provided with inturned flanges 4. The flange 3 and the adjacent flange 4 of the extra rim 2 are engaged by U-shaped members 5 having their side arms 6 converging outwardly from the base of the member, and provided with pointed projections 7 to bite the flanges when spread by the instrumentalities to be hereinafter described. The base of each U-shaped member 5 is provided with an opening 8 to receive a threaded stem 9 having its end formed wedge-shaped, as shown at 10 to engage between the flanges and clamp them within the U-shaped members 5. Nuts 11 are threaded on the stems 9 and by engaging the ends of tubular member 12 serve to project the stems 9 from the tubular member, and move the wedge-shaped ends of said threaded stems between the flanges 3 and 4 into engagement with the side arms 6, the pointed projections 7 biting into said flanges, so as to hold the extra tread rim 2 in alinement with the tread of the traction wheel 1 to increase the tread surface of a traction wheel, as hereinbefore stated.

It will be understood that the device provides for quickly attaching the extra tread rim to the traction wheel and removing it therefrom, the simplicity of the device being readily apparent.

What is claimed is:—

1. Means for clamping an extra rim to a traction wheel having a flange thereon, comprising a flange on the extra rim, U-shaped clamping members embracing said flanges, the side arms of said U-shaped member converged, and a wedge member engaging between the flanges and spreading them into clamped relation with said side arms of the U-shaped members.

2. Means for clamping an extra rim to a traction wheel having a flange thereon, comprising a flange on the extra rim, U-shaped clamping members embracing said flanges, pointed projections on the side arms of said U-shaped member, and a wedge member engaging between the flanges and spreading them into clamped relation with said arms and into engagement with said pointed projections thereon.

3. Means for clamping an extra rim to a traction wheel having a flange thereon, comprising a flange on the extra rim, U-shaped members embracing said flanges and having openings therein, threaded members having tapered ends to engage between the flanges through said openings, a tube slidably engaging said threaded members, and nuts on said threaded members and engaging the tube to actuate said members into clamping engagement with the flanges.

4. Means for clamping an extra rim to a traction wheel having a flange thereon, comprising a flange on the extra rim, U-shaped members embracing said flanges and having openings therein, the side arms of said U-shaped members being converged, threaded members having tapered ends to engage between the flanges through said openings, a tube slidably engaging said threaded members and spanning the wheel, and nuts on said threaded members and terminally engaging the tube to force the tapered ends of said members between the flanges and spread them into engagement with the arms of the U-shaped members.

In testimony whereof I affix my signature.

EDGAR R. SANDERS.